(12) United States Patent  
Xiong

(10) Patent No.: US 9,392,583 B2
(45) Date of Patent: Jul. 12, 2016

(54) METHOD, ENTITY, AND SYSTEM FOR IMPLEMENTING TRUNK SERVICE

(71) Applicant: Huawei Technologies Co., Ltd., Shenzhen (CN)

(72) Inventor: Chunshan Xiong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 106 days.

(21) Appl. No.: 14/318,071

(22) Filed: Jun. 27, 2014

(65) Prior Publication Data

US 2014/0307682 A1 Oct. 16, 2014

Related U.S. Application Data

(63) Continuation of application No. PCT/CN2012/087023, filed on Dec. 20, 2012.

(30) Foreign Application Priority Data

Dec. 27, 2011 (CN) .......................... 2011 1 0443994

(51) Int. Cl.
*H04W 72/04* (2009.01)
*H04W 24/02* (2009.01)
(Continued)

(52) U.S. Cl.
CPC .......... *H04W 72/0406* (2013.01); *H04W 24/02* (2013.01); *H04W 4/18* (2013.01); *H04W 36/14* (2013.01); *H04W 84/08* (2013.01); *H04W 92/02* (2013.01)

(58) Field of Classification Search
None
See application file for complete search history.

(56) References Cited

U.S. PATENT DOCUMENTS

2006/0105792 A1  5/2006  Armbruster et al.
2008/0096547 A1* 4/2008  Zhang .................. H04W 24/04
                                                455/424

(Continued)

FOREIGN PATENT DOCUMENTS

CN      1835605 A    9/2006
CN    101057512 A   10/2007

(Continued)

OTHER PUBLICATIONS

"3rd Generation Partnership Project; Technical Specification Group Services and Systems Aspects; Policy and Charging Control Architecture," 3GPP TS 23.203, 3rd Generation Partnership (3GPP), No. V11.4.0, Dec. 2011, 167 pages.

(Continued)

*Primary Examiner* — Kodzovi Acolatse
(74) *Attorney, Agent, or Firm* — Slater Matsil, LLP

(57) ABSTRACT

The present invention discloses a method, includes: receiving uplink control plane signaling or uplink control plane signaling and uplink user plane media data sent by a UE; performing, encapsulation and conversion on the uplink control plane signaling or the uplink control plane signaling and the uplink user plane media data, and sending the uplink control plane signaling or the uplink control plane signaling and the uplink user plane media data after the encapsulation and conversion to a TCF; receiving downlink control plane signaling or downlink control plane signaling and downlink user plane media data sent by the TCF; and performing encapsulation and conversion on the downlink control plane signaling or the downlink control plane signaling and the downlink user plane media data, and sending the downlink control plane signaling or the downlink control plane signaling and the downlink user plane media data after the encapsulation and conversion to the UE.

22 Claims, 7 Drawing Sheets

(51) Int. Cl.
*H04W 36/14* (2009.01)
*H04W 4/18* (2009.01)
*H04W 84/08* (2009.01)
*H04W 92/02* (2009.01)

(56) References Cited

U.S. PATENT DOCUMENTS

| | | | | |
|---|---|---|---|---|
| 2008/0096553 | A1* | 4/2008 | Saksena | H04W 28/06 455/426.2 |
| 2008/0112407 | A1 | 5/2008 | Liu | |
| 2008/0114881 | A1 | 5/2008 | Lee et al. | |
| 2008/0305772 | A1* | 12/2008 | Balasubramanian ... | H04L 63/08 455/411 |
| 2011/0280217 | A1* | 11/2011 | Drevon | H04W 48/18 370/331 |
| 2011/0287785 | A1* | 11/2011 | Hu | H04W 8/08 455/456.2 |
| 2012/0011271 | A1* | 1/2012 | Zhao | H04W 4/18 709/234 |
| 2012/0170503 | A1* | 7/2012 | Kelley | H04W 48/06 370/312 |

FOREIGN PATENT DOCUMENTS

| | | |
|---|---|---|
| CN | 101133663 A | 2/2008 |
| CN | 101299832 A | 11/2008 |
| CN | 101325740 A | 12/2008 |
| CN | 101578891 A | 11/2009 |
| GB | 2423888 A | 6/2006 |
| WO | 0145335 A1 | 6/2001 |
| WO | 2006115740 A2 | 11/2006 |

OTHER PUBLICATIONS

"3rd Generation Partnership Project; Technical Specification Group Services and Systems Aspects; General Packet Radio Service (GPRS) Enhancements for Evolved Universal Terrestrial Radio Access Network (E-UTRAN) Access (Release 11)," 3GPP TS 23.401, 3rd Generation Partnership (3GPP), No. V11.0.0, Dec. 2011, 287 pages.

"3rd Generation Partnership Project; Technical Specification Group GSM/EDGE Radio Access Network; Generic Access Network (GAN); Stage 2, (Release 10)," 3GPP TS 43.318, 3rd Generation Partnership (3GPP), No. V10.1.0, Mar. 2011, 128 pages.

"3rd Generation Partnership Project; Technical Specification Group GSM/EDGE Radio Access Network; Generic Access Network (GAN); Mobile GAN Interface Layer 3 Specification, (Release 11)," 3GPP TS 44.318, 3rd Generation Partnership (3GPP), No. V11.0.0, Mar. 2011, 252 pages.

"Research on the TD-LTE-Based Broadband Digital Trunking Communications System," China Communications Standards Association (CCSA), China Potevio Co., Ltd., 2010, 132 pages.

Stewart. R. et al., "Stream Control Transmission Protocol," RFC 4960 Network Working Group, Standards Track, Sep. 2007, 152 pages.

"3rd Generation Partnership Project; Technical Specification, Voice Over LTE via Generic Access; Stage 2 Specification; Phase1," VoLGA Stage 2, No. V1.7.0, Jun. 14, 2010, 97 pages.

"3rd Generation Partnership Project; Technical Specification Group; Telecommunication Management; Charging Management; Charging Data Description for IP Multimedia Subsystem; (Release 5)," 3GPP TS 32.225, V1.3.0, May 2002, 98 pages.

3GPP TS 29.305 V11.0.0, 3rd Generation Partnership Project; Technical Specification Group Core Network and Terminals; InterWorking Function (IWF) between MAP based and Diameter Based Interfaces (Release 11), Sep. 2011, 64 pages.

3GPP TSG CT WG4 Meeting #41, "Pseudo-CR on Message Routing Mechanism for IWF TS," 3GPP TS 29.305, C4-083695, Agenda Item 6.5, Document for Decision, Nov. 10-14, 2008, 2 pages.

\* cited by examiner

METHOD, ENTITY, AND SYSTEM FOR IMPLEMENTING TRUNK SERVICE

This application is a continuation of International Application No. PCT/CN2012/087023, filed on Dec. 20, 2012, which claims priority to Chinese Patent Application No. 201110443994.0, filed on Dec. 27, 2011, both of which are hereby incorporated by reference in their entireties.

TECHNICAL FIELD

The present invention relates to the field of communications technologies, and in particular, to a method, entity, and system for implementing a trunk service.

BACKGROUND

With rapid development of mobile communications, a trunk system, serving as a commanding and scheduling system in dedicated mobile communications, has a dual function of switching and controlling, and basic service functions provided by the trunk system such as group call, floor preemption, and dynamic group number assignment have become important parts of mobile communications services.

Currently, existing trunk systems are all narrow-band trunk systems oriented to specific radio access technologies, and this type of narrow-band trunk system implements a delay required by trunk communication by reconstructing a radio technology system.

Because the existing trunk system reconstructs the radio access technology system, costs for implementing trunk services are increased, and coupling of the narrow-band trunk system and the radio access technology provided in the prior art limits functions of the trunk system.

SUMMARY OF THE INVENTION

In order to reduce costs for implementing trunk services and expand functions of a trunk system, embodiments of the present invention provide a method, entity, and system for implementing a trunk service. The technical solutions are described as follows:

In accordance with an embodiment, a method for implementing a trunk service is provided, as may be performed by an interworking function (IWF) entity. In this example, the method includes receiving uplink signaling comprising at least uplink control plane signaling sent by a trunk user equipment (UE), performing encapsulation and conversion on the uplink signaling to obtain encapsulated and converted uplink signaling, and sending the encapsulated and converted uplink signaling to a trunk control function (TCF) entity. The method further includes receiving downlink signaling comprising at least downlink control plane signaling sent by the TCF entity, performing encapsulation and conversion on the downlink signaling to obtain encapsulated and converted downlink signaling, and sending the encapsulated and converted downlink signaling to the UE. An apparatus for performing this method is also provided. In one example, the apparatus comprises a receiver and a transmitter configured to perform one or more of the abovementioned steps.

In accordance with another embodiment, another method for implementing a trunk service is provided, as might be performed by a trunk UE. In this example, the method includes sending uplink signaling that includes at least uplink control plane signaling to an interworking function (IWF) entity to prompt the IWF entity both to perform encapsulation and conversion on the uplink signaling and to send the resulting encapsulated and converted uplink signaling to a trunk control function (TCF) entity. The method further includes receiving encapsulated and converted downlink signaling sent by the IWF entity. The encapsulated and converted downlink signaling was obtained by the IWF entity through encapsulating and converting downlink signaling communicated from the TCF entity to the IWF entity. The downlink signaling includes at least downlink control plane signaling. An apparatus for performing this method is also provided. In one example, the apparatus comprises a receiver and a transmitter configured to perform one or more of the abovementioned steps.

In accordance with yet another embodiment, yet another method for implementing a trunk service is provided, as might be performed by a trunk control function (TCF) entity. In this example, the method includes receiving encapsulated and converted uplink signaling from an interworking function (IWF) entity. The encapsulated and converted uplink signaling was formed at the IWF entity by encapsulating and converting uplink signaling communicated from a trunk UE to the IWF entity. The uplink signaling includes at least uplink control plane signaling. The method further includes sending downlink signaling that includes at least downlink control plane signaling to the IWF entity to prompt the IWF entity both to perform encapsulation and conversion on the downlink control plane signaling and to send the resulting encapsulated and converted downlink control plane signaling to the trunk UE. An apparatus for performing this method is also provided. In one example, the apparatus comprises a receiver and a transmitter configured to perform one or more of the abovementioned steps.

In still another aspect, a system for implementing a trunk service is further provided, and the system includes: an interworking function IWF, a trunk UE, and a trunk control function (TCF), where: the IWF is the foregoing IWF, the UE is the foregoing UE, and the TCF is the foregoing TCF.

The technical solutions of the embodiments of the present invention bring the following beneficial effects:

An IWF configured to perform encapsulation and conversion on control plane signaling and user plane media data between a UE and a TCF is arranged, and therefore, after a new radio access technology is introduced in a trunk system, an economical and effective method can be proposed to introduce an existing trunk system and product into the new radio access system, which can not only expand functions of the trunk system, but also increase a speed of the trunk product entering a market, ensure functions of the trunk system, and lower a development cost of the trunk product in the new radio access technology.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer, the following further describes the implementation manners of the present invention in detail with reference to the accompanying drawings.

Figure 1:
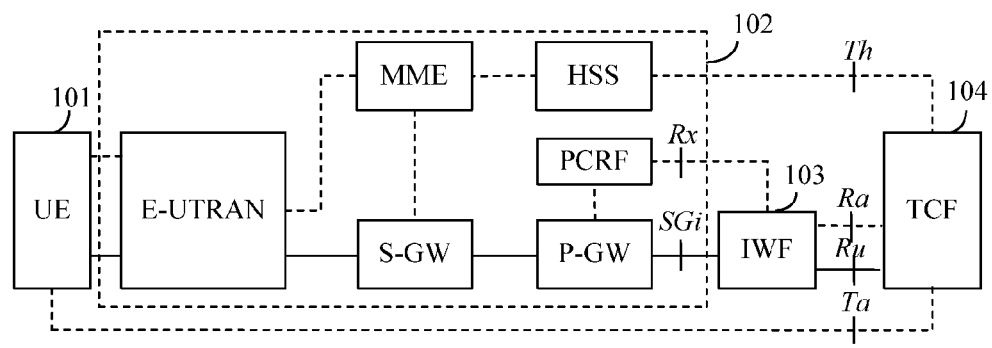
FIG. 1 is a schematic structural diagram of a trunk system according to an embodiment of the present invention.

In an embodiment of the present invention, a method for implementing a trunk service is provided. For ease of understanding and description, before the specific method is introduced, a structure of a trunk system shown in FIG. 1 is briefly introduced. Referring to FIG. 1, the trunk system includes: a trunk UE 101, an interworking function (IWF) entity 103, and a Trunk Control Function (TCF) entity 104.

The UE 101 is configured to implement interaction of control plane signaling and user plane media data with the TCF 104 by using the IWF 103.

The IWF 103 is configured to perform encapsulation and conversion on the control plane signaling and the user plane media data between the UE 101 and the TCF 104, and send the control plane signaling and the user plane media data after the encapsulation and conversion to the TCF 104 and the UE 101.

The TCF 104 is configured to establish, maintain, control, and manage a trunk access bearer, and perform call control and group management of the UE 101.

Further, as shown in FIG. 1, the trunk system further includes a trunk access subsystem 102, and the UE 101 may be connected to the IWF 103 by using the trunk access subsystem 102.

The trunk access subsystem 102 is an LTE (Long Term Evolution, long term evolution) or EPS (Evolved Packet System, evolved packet system) system, and is configured to provide IP (Internet Protocol, Internet Protocol) connection support for communication being performed by the UE 101. The trunk access subsystem 102 includes an Evolved Universal Terrestrial Radio Access Network (EUTRAN), a Mobility Management Entity (MME), a Serving Gateway (SGW), a Packet Data Network Gateway (PGW), and a Home Subscriber Server (HSS).

Figure 2:
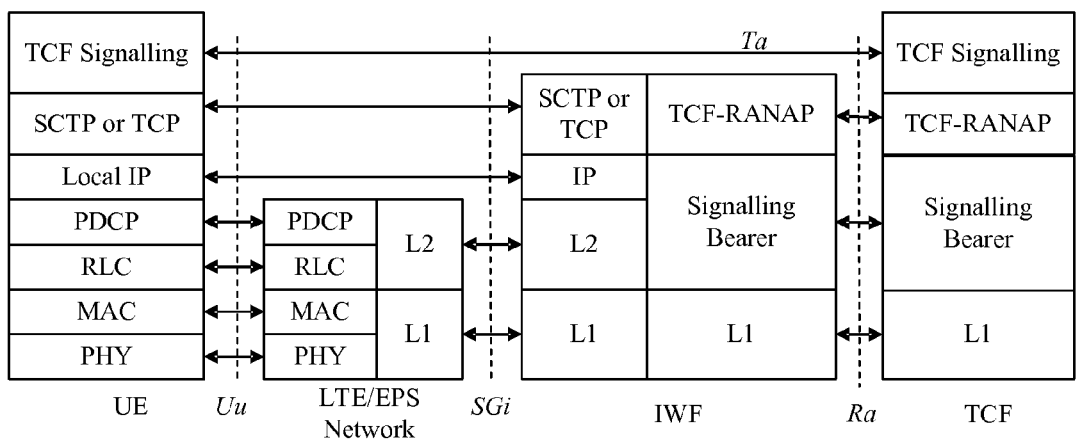
FIG. 2 is a schematic diagram of a control plane protocol stack of a trunk system according to another embodiment of the present invention.

A control plane protocol stack of the trunk system is shown in FIG. 2. For simplicity, interfaces in an LTE/EPS system in FIG. 2, as defined explicitly in a 3GPP specification, are not described herein again. In FIG. 2, the UE 101 is connected to the trunk access subsystem 102 through a Uu interface; the trunk access subsystem 102 is connected to the IWF 103 through an SGi interface; the IWF 103 is connected to the TCF 104 through an Ra interface; the UE 101 is connected to the TCF 104 through a Ta interface; and the control plane signaling between the UE 101 and the TCF 104 is transmitted by using a Radio Access Network Application Part (TCF-RANAP) protocol on the Ra interface and an Stream Control Transmission Protocol (SCTP)/IP or a Transmission Control Protocol (TCP)/IP protocol on the SGi interface.

A signaling bearer is a control plane signaling bearer, a function of a Packet Data Convergence Protocol (PDCP) is IP layer data processing, for example, IP header compression and/or encryption processing, and data reordering and retransmission during a handover process. An Radio Link Control (RLC) layer is located between the PDCP layer and a Medium Access Control (MAC) layer, and has a main function of segmenting data of an upper layer and reassembling the data to adapt to transmission over a air interface, and the RLC may have functions such as resolving data loss by retransmission. The MAC is located above a physical layer, the MAC is responsible for functions of upper layer data transmission, such as scheduling, multiplexing, and de-multiplexing, and the Physical Layer (PHY) is the lowest layer of an LTE air interface transmission protocol. L1 in a network refers to a physical layer, such as an optical fiber or a copper cable. L2 is a data link layer. The TCF-RANAP is a protocol similar to an RANAP protocol or a Base Station Subsystem Application (BSSAP) protocol or a Base Station Subsystem General Packet Radio Service (BSSGP) protocol, and has a main function of controlling and managing a trunk access bearer. A local IP address on the UE 101 side is an IP address allocated by the PGW of the EPS system to the UE 101. The Ta is a control plane logical interface between the UE 101 and the TCF 104, and is similar to a Non Access Stratum (NAS) interface in the 3GPP. Main functions of the Ta are a trunk call control function and a group management function, as shown in FIG. 2. The Ta performs transparent transmission by using the TCF-RANAP protocol on the Ru interface, and performs transmission reliably by using the SCTP/IP protocol or the TCP/IP protocol on the SGi interface.

Figure 3:
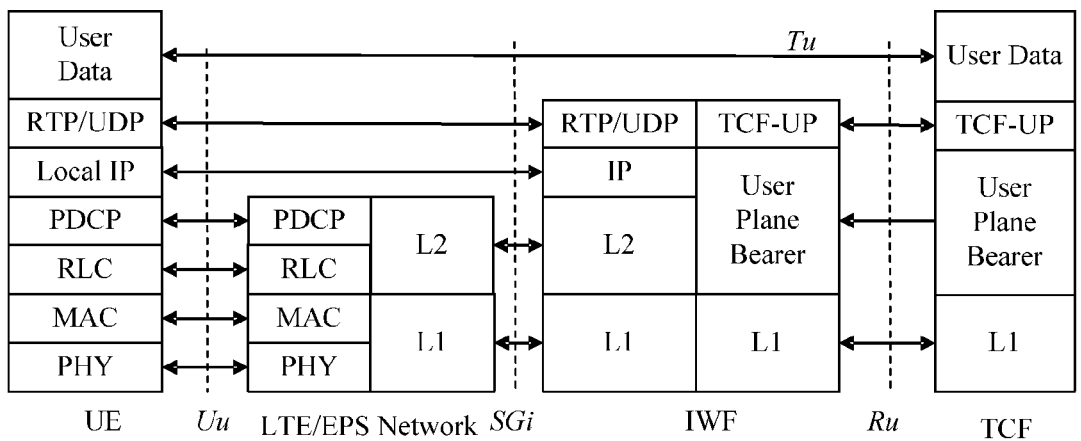
FIG. 3 is a schematic diagram of a user plane protocol stack of a trunk system according to another embodiment of the present invention.

A user plane protocol stack of the trunk system is shown in FIG. 3. For simplicity, interfaces in an LTE/EPS system in FIG. 3, as defined explicitly in a 3GPP specification, are not described herein again. In FIG. 3, the UE 101 is connected to the trunk access subsystem 102 through a Uu interface; the trunk access subsystem 102 is connected to the IWF 103 through an SGi interface; the IWF 103 is connected to the TCF 104 through an Ru interface; the UE 101 is connected to the TCF 104 through a Tu interface; and user plane media data between the UE 101 and the TCF 104 is transmitted by using a TCF-UP protocol on the Ru interface and an Real-time Transport Protocol (RTP)/User Datagram Protocol (UDP)/IP protocol on the SGi interface.

The TCF-UP is a protocol similar to an Iu UP protocol, and a main function of the TCF-UP is to transmit voice or other user plane media data. A local IP address on the UE 101 side is the same as above, that is, an IP address allocated by the PGW of the EPS system to the UE 101. Media stream data (such as voice or video data) between the UE 101 and the TCF 104 is transparently transmitted by using the TCF-UP protocol on the Ru interface, and then transmitted by using the RTP/UDP/IP on the SGi interface.

Based on the control plane protocol stack shown in FIG. 2 and the user plane protocol stack shown in FIG. 3, that the IWF 103 performs encapsulation and conversion on the control plane signaling between the UE 101 and the TCF 104 means that: when the IWF 103 receives, from the UE 101, control plane signaling sent to the TCF 104, the IWF 103 first decapsulates the control plane signaling from the SCTP/IP or the TCP/IP, then re-encapsulates the control plane signaling by using the TCF-RANAP, and sends the re-encapsulated control plane signaling to the TCF 104; when the IWF 103 receives, from the TCF 104, control plane signaling sent to the UE 101, the IWF 103 first decapsulates the control plane signaling from the TCF-RANAP, then re-encapsulates the control plane signaling by using the SCTP/IP or the TCP/IP, and sends the re-encapsulated control plane signaling to the UE 101.

That the IWF 103 performs encapsulation and conversion on the user plane media data between the UE 101 and the TCF 104 means that: when the IWF 103 receives, from the UE 101, user plane media data sent to the TCF 104, the IWF 103 first decapsulates the user plane media data from the RTP/UDP/IP, then re-encapsulates the user plane media data by using the TCF-UP, and sends the re-encapsulated user plane media data to the TCF 104; when the IWF 103 receives, from the TCF 104, user plane media data sent to the UE 101, the IWF 103 first decapsulates the user plane media data from the TCF-UP, then re-encapsulates the user plane media data by using the RTP/UDP/IP, and sends the re-encapsulated user plane media data to the UE 101.

Further, referring to FIG. 1, the trunk access subsystem 102 further includes a Policy and Charging Rules Function (PCRF).

In the trunk system provided in this embodiment, the UE, EUTRAN, MME, SGW, PGW and HSS are all entities in the LTE/EPS system defined by the 3GPP, where the UE 101 is also a trunk terminal. The IWF 103 is a device configured to perform encapsulation and conversion on a message (control plane signaling and user plane media data of a user plane) for interaction between the TCF 104 and the UE 101, and the IWF 103 further simulates a radio access part of the TCF 104 and triggers, through an Rx interface, the PCRF to manage an EPS bearer, so as to provide a transmission channel for communication with the TCF. In a case in which the UE 101, the LTE/EPS system device, and the TCF 104 are all existing products, only the IWF 103 needs to be developed, and a trunk product based on the radio access technology can be turned into a trunk product based on the latest radio access technology (such as LTE), so that rapid, high-efficiency, and low-cost development of a trunk product can be implemented. Moreover, in addition to the functions of the entities introduced in the foregoing, other entities also have their respective existing functions, as described below:

The MME is a network endpoint of NAS control plane signaling, can implement encryption of the NAS control plane signaling, control plane signaling (terminated on an S3 interface) between core network nodes when the MME moves between different access technologies of the 3GPP, tracking (including controlling and executing paging retransmission) of a terminal in an idle state, and can further implement selection of the PGW and the SGW, select a new MME in a handover process in which the MME is changed, select an SGSN in a handover process to a 2G/3G access system, and provide roaming support (connected to an HSS of a home network through an S6a interface); in addition, the MME is further responsible for authentication, a bearer management (including establishment of a dedicated bearer), lawful interception (control plane signaling), Earthquake and Tsunami Warning System (ETWS) function support, and the like.

The SGW is a gateway terminated in the EUTRAN, and for each terminal attached to the EPS, there is only one SGW serving the terminal at every moment. The SGW is not only a mobility anchor during a handover between eNodeBs, but also a mobility anchor (S4 endpoint and transfer of data between the 2G/3G network and the PGW) during a handover between different access systems of the 3GPP. The SGW is also an E-UTRAN idle state data buffer and an initiator point of a network side service request, and has functions such as lawful interception, data routing and forwarding, charging, and transmission layer packet marking.

The PGW is a gateway terminated on the SGi interface of the PDN, and if a terminal accesses multiple PDNs, there may be one or more PGWs serving the terminal. The PGW not only can execute a policy, but also has a user packet filter (for example, by using deep packet inspection); in addition, the PGW also has functions such as charging support, lawful interception, terminal IP address allocation, uplink and downlink rate control, and Dynamic Host Configuration Protocol (DHCP) IPv4/IPv6.

The PCRF may implement quality of service (QoS) based control and charging, and is a logical entity associated with a policy rule of an operator.

Further, during actual deployment of the trunk system shown in FIG. 1, different nodes may further be combined into one node. A specific combination manner is not limited in this embodiment, and only schematic diagrams of the trunk systems after the combination shown in FIG. 4 and FIG. 5 are used as examples.

Figure 4:
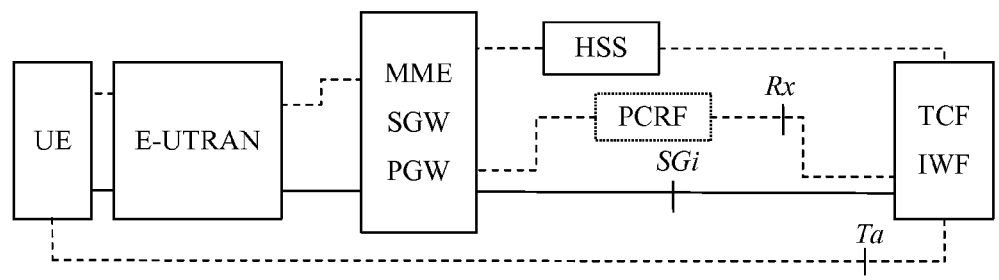
FIG. 4 is a schematic structural diagram of another trunk system according to another embodiment of the present invention.

In a system architecture shown in FIG. 4, the MME, the SGW, and the PGW are combined into one node, and the TCF 104 and the IWF 103 are combined into one node. Because the IWF 103 is built in the TCF 104, interaction between the IWF 103 and the TCF 104 is no longer required, and the control plane signaling and the user plane media data of the TCF 104 are directly encapsulated and decapsulated. Therefore, the development of the IWF 103 is spared, and only functions of the TCF 104 are trimmed. In addition, the PCRF may not be deployed; therefore, the interaction between the PCRF and the IWF 103 and interaction between the PCRF and the PGW are no longer required, and the trunk system performs IP data communication with the UE 101 by using a fixed port number. In addition, the HSS may be an independent node, and may also be further combined into the combined node of MME+SGW+PGW, or the HSS may be combined to the combined node of TCF+IWF. An advantage of using this architecture is that, this novel trunk network structure is very simple, and is suitable for rapid development and rapid deployment.

Figure 5:
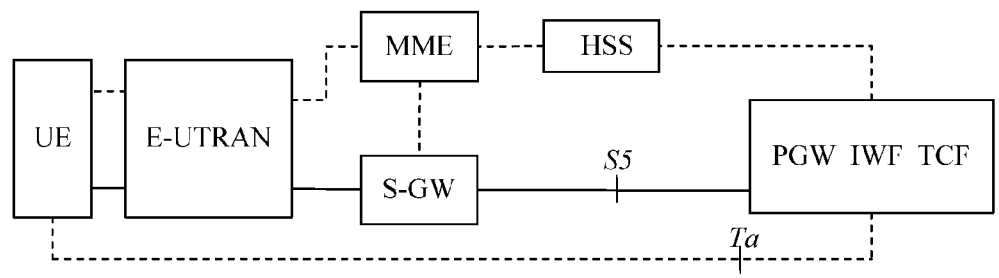
FIG. 5 is a schematic structural diagram of still another trunk system according to another embodiment of the present invention.

In a system architecture shown in FIG. 5, the MME and SGW are combined into one node, and the TCF 104, the IWF 103, and the PGW are combined into one node. In fact, functions of the TCF 104 are expanded and include the functions of the PGW and the IWF 103. Because the IWF 103 is built in the TCF 104, interaction between the IWF 103 and the TCF 104 is no longer required, and the control plane signaling and the user plane media data of the TCF 104 are directly encapsulated and decapsulated. Therefore, the development of the IWF 103 is spared, and only the functions of the TCF 104 are trimmed. In addition, after the IWF 103 is combined with the PGW, the PCRF is not used, and the interaction between the PCRF and the IWF 103 and interaction between the PCRF and the PGW are no longer required. The PGW is combined with the IWF 103 and the TCF 104, and therefore, the UE 101 may communicate with the TCF 104 through a dynamic port, and in a process of establishing a bearer, a traffic flow template (TFT) of the bearer is transferred to the UE 101 without the need of a bearer modification process, thereby greatly simplifying the process of establishing the bearer. In addition, the HSS may be an independent node, and may also be further combined into the MME node, or the HSS may be combined to the combined node of TCF+IWF+PGW. Definitely, the MME and the SGW may also be combined. An advantage of using this architecture is that, this novel trunk network structure is also very simple, is suitable for rapid development and rapid deployment, and can support a great number of users.

Figure 6:
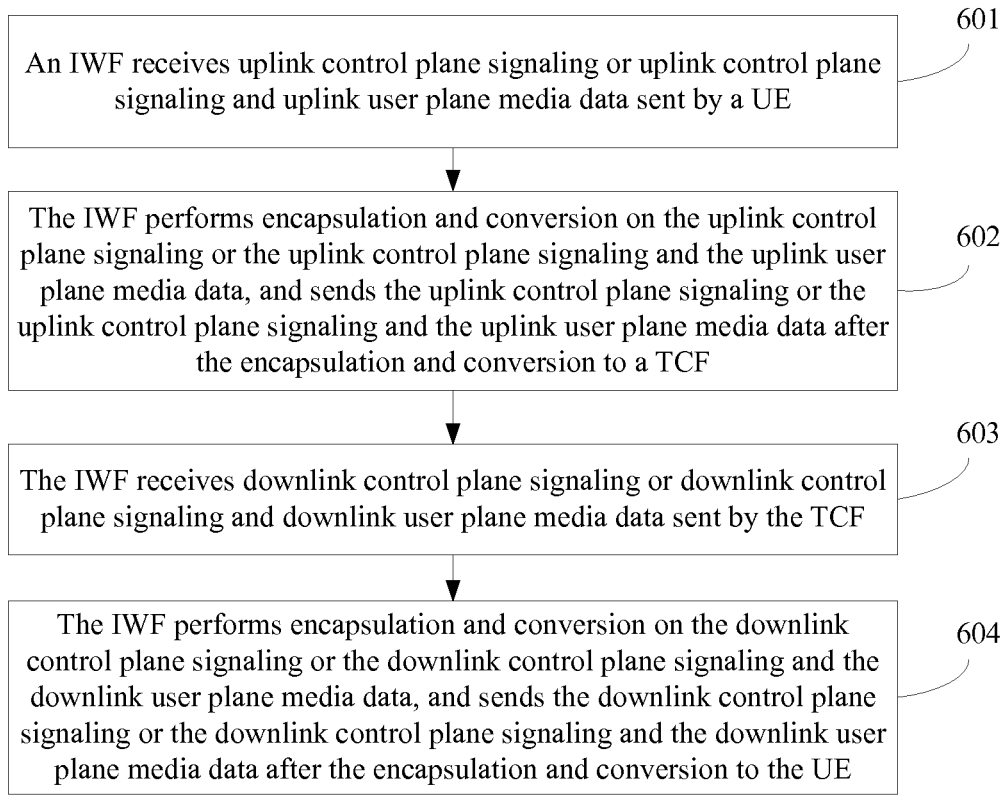
FIG. 6 is a flowchart of a method for implementing a trunk service according to another embodiment of the present invention.

Based on the architecture of the foregoing trunk system, in another embodiment of the present invention, a method for implementing a trunk service is provided by using implementation of a trunk service from a perspective of an interworking function IWF as an example. Referring to FIG. 6, the process of the method is specifically described as follows:

601. An IWF receives uplink control plane signaling or uplink control plane signaling and uplink user plane media data sent by a UE.

602. The IWF performs encapsulation and conversion on the uplink control plane signaling or the uplink control plane signaling and the uplink user plane media data, and sends the uplink control plane signaling or the uplink control plane signaling and the uplink user plane media data after the encapsulation and conversion to a TCF.

603. The IWF receives downlink control plane signaling or downlink control plane signaling and downlink user plane media data sent by the TCF.

604. The IWF performs encapsulation and conversion on the downlink control plane signaling or the downlink control plane signaling and the downlink user plane media data, and sends the downlink control plane signaling or the downlink control plane signaling and the downlink user plane media data after the encapsulation and conversion to the UE.

Further, the receiving, by an IWF, uplink control plane signaling or uplink control plane signaling and uplink user plane media data sent by a UE includes: receiving, by the IWF from a default bearer in a trunk access subsystem, the uplink control plane signaling or the uplink control plane signaling and the uplink user plane media data sent by the UE, where the default bearer is a default bearer on a packet data network PDN connection established by the UE to a dedicated access point name APN corresponding to a trunk.

Further, the receiving, by an IWF, uplink control plane signaling and uplink user plane media data sent by a trunk UE includes receiving, by the IWF from a default bearer in a trunk access subsystem, the uplink control plane signaling sent by the UE. and receiving, from a dedicated bearer, the uplink user plane media data sent by the UE, where the default bearer and the dedicated bearer are a default bearer and a dedicated bearer on a packet data network PDN connection established by the UE to a dedicated access point name APN corresponding to the trunk.

Further, the receiving, by an IWF, uplink control plane signaling or uplink control plane signaling and uplink user plane data sent by a trunk UE includes: receiving, by the IWF through a Stream Control Transmission Protocol SCTP connection or a Transmission Control Protocol TCP connection, the uplink control plane signaling sent by the UE, where the SCTP connection or the TCP connection is an SCTP connection or a TCP connection established between the IWF and the UE by using a trunk access subsystem; and receiving, by the IWF through a Real-time Transport Protocol RTP connection, the uplink user plane media data sent by the UE to the TCF, where the RTP connection is an RTP connection established between the IWF and the UE by using the trunk access subsystem.

Further, the performing, by the IWF, encapsulation and conversion on the uplink control plane signaling or the uplink control plane signaling and the uplink user plane media data, and sending the uplink control plane signaling or the uplink control plane signaling and the uplink user plane media data after the encapsulation and conversion to a TCF include: performing, by the IWF, the encapsulation and conversion on the uplink control plane signaling sent by the UE to the TCF, and sending the uplink control plane signaling after the encapsulation and conversion to the TCF through an Ra interface connection, where the Ra interface connection is an Ra interface connection established between the IWF and the TCF; and performing, by the IWF, the encapsulation and conversion on the uplink user plane media data sent by the UE to the TCF, and sending the uplink user plane media data after the encapsulation and conversion to the TCF through an Ru interface connection, where the Ru interface connection is an Ru interface connection established between the IWF and the TCF.

Further, the receiving, by the IWF, downlink control plane signaling or downlink control plane signaling and downlink user plane media data sent by the TCF includes: receiving, by the IWF, the downlink control plane signaling sent by the TCF to the UE through an Ra interface connection, where the Ra interface connection is an Ra interface connection established between the IWF and the TCF; and receiving, by the IWF, the downlink user plane media data sent by the TCF to the UE through an Ru interface connection, where the Ru interface connection is an Ru interface connection established between the IWF and the TCF.

Further, the performing, by the IWF, encapsulation and conversion on the downlink control plane signaling or the downlink control plane signaling and the downlink user plane media data, and sending the downlink control plane signaling or the downlink control plane signaling and the downlink user plane media data after the encapsulation and conversion to the UE include: performing, by the IWF, the encapsulation and conversion on the downlink control plane signaling or the downlink control plane signaling and the downlink user plane media data, and sending, through a default bearer in the trunk access subsystem, the downlink control plane signaling or the downlink control plane signaling and the downlink user plane media data after the encapsulation and conversion to the UE, where the default bearer is a default bearer on a packet data network PDN connection established by the UE to a dedicated access point name APN corresponding to the trunk.

Further, the performing, by the IWF, encapsulation and conversion on the downlink control plane signaling and the downlink user plane media data, and sending the downlink control plane signaling and the downlink user plane media data after the encapsulation and conversion to the UE include: performing, by the IWF, the encapsulation and conversion on the downlink control plane signaling and the downlink user plane media data, sending, through a default bearer in the trunk access subsystem, the downlink control plane signaling after the encapsulation and conversion to the UE, and sending, through a dedicated bearer in the trunk access subsystem, the downlink user plane media data after the encapsulation and conversion to the UE, where the default bearer and the dedicated bearer are a default bearer and a dedicated bearer on a packet data network PDN connection established by the UE to a dedicated access point name APN corresponding to the trunk.

Further, the performing, by the IWF, encapsulation and conversion on the downlink control plane signaling or the downlink control plane signaling and the downlink user plane media data, and sending the downlink control plane signaling or the downlink control plane signaling and the downlink user plane media data after the encapsulation and conversion to the UE include: sending, by the IWF, the downlink control plane signaling to the UE through an SCTP connection or a TCP connection, where the SCTP connection or the TCP connection is an SCTP connection or a TCP connection established between the IWF and the UE by using the trunk access subsystem; and sending, by the IWF, the downlink user plane media data to the UE through an RTP connection, where the RTP connection is an RTP connection established between the IWF and the UE by using the trunk access subsystem.

Figure 7:
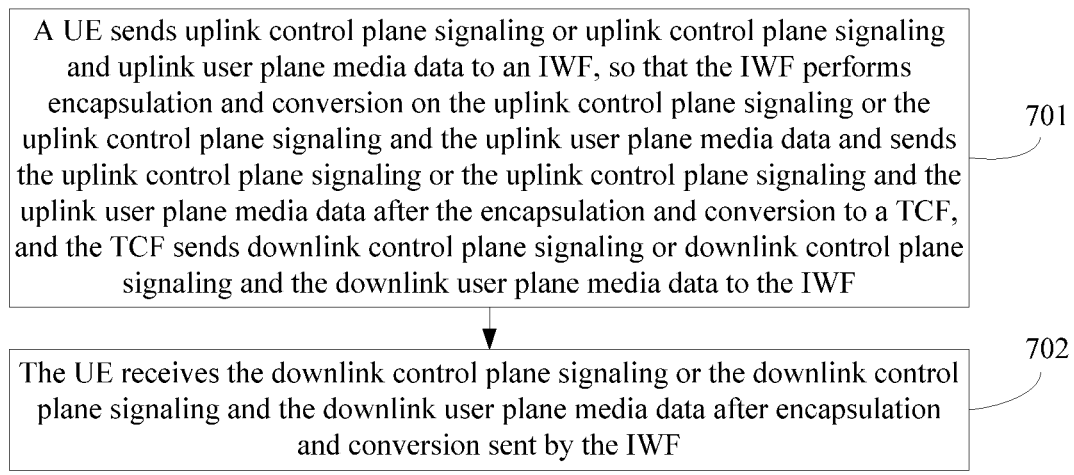
FIG. 7 is a flowchart of a method for implementing a trunk service according to another embodiment of the present invention.

In another embodiment of the present invention, a method for implementing a trunk service is provided by using implementation of a trunk service from a perspective of a trunk UE as an example. Referring to FIG. 7, the process of the method is specifically described as follows:

701. A UE sends uplink control plane signaling or uplink control plane signaling and uplink user plane media data to an IWF, so that the IWF performs encapsulation and conversion on the uplink control plane signaling or the uplink control plane signaling and the uplink user plane media data and sends the uplink control plane signaling or the uplink control plane signaling and the uplink user plane media data after the encapsulation and conversion to a TCF, and the TCF sends downlink control plane signaling or downlink control plane signaling and downlink user plane media data to the IWF.

702. The UE receives the downlink control plane signaling or the downlink control plane signaling and the downlink user plane media data after encapsulation and conversion sent by the IWF.

Further, the sending, by a UE, uplink control plane signaling or uplink control plane signaling and uplink user plane media data to an IWF includes: sending, by the UE from a default bearer in a trunk access subsystem, the uplink control plane signaling or the uplink control plane signaling and the uplink user plane media data, where the default bearer is a default bearer on a packet data network PDN connection established by the UE to a dedicated access point name APN corresponding to a trunk.

Further, the sending, by a UE, uplink control plane signaling and uplink user plane media data to an IWF includes: sending, by the UE, the uplink control plane signaling from a default bearer in a trunk access subsystem, and sending the uplink user plane media data from a dedicated bearer, where the default bearer and the dedicated bearer are a default bearer and a dedicated bearer on a packet data network PDN connection established by the UE to a dedicated access point name APN corresponding to the trunk.

Further, the sending, by a UE, uplink control plane signaling or uplink control plane signaling and uplink user plane media data to an IWF includes: sending, by the UE, the uplink control plane signaling to the IWF through a Stream Control Transmission Protocol SCTP connection or a Transmission Control Protocol TCP connection, where the SCTP connection or the TCP connection is an SCTP connection or a TCP connection established between the UE and the IWF by using a trunk access subsystem; and sending, by the UE, the uplink user plane media data to the IWF through a Real-time Transport Protocol RTP connection, where the RTP connection is an RTP connection established between the IWF and the UE by using the trunk access subsystem.

Further, the receiving, by the UE, the downlink control plane signaling or the downlink control plane signaling and the downlink user plane media data after encapsulation and conversion sent by the IWF includes: receiving, by the UE, the downlink control plane signaling or the downlink control plane signaling and the downlink user plane media data sent by the IWF through a default bearer in the trunk access subsystem, where the default bearer is a default bearer on a packet data network PDN connection established by the UE to a dedicated access point name APN corresponding to the trunk.

Further, the receiving, by the UE, the downlink control plane signaling and the downlink user plane media data after encapsulation and conversion sent by the IWF includes: receiving, by the UE, the downlink control plane signaling after the encapsulation and conversion sent by the IWF through a default bearer in the trunk access subsystem, and the downlink user plane media data after the encapsulation and conversion sent through a dedicated bearer in the trunk access subsystem, where the default bearer and the dedicated bearer are a default bearer and a dedicated bearer on a packet data network PDN connection established by the UE to a dedicated access point name APN corresponding to the trunk.

Further, the receiving, by the UE, the downlink control plane signaling or the downlink control plane signaling and the downlink user plane media data after encapsulation and conversion sent by the IWF includes: receiving, by the UE, the downlink control plane signaling after the encapsulation and conversion sent by the IWF through an SCTP connection or a TCP connection, where the SCTP connection or the TCP connection is an SCTP connection or a TCP connection established between the UE and the IWF by using the trunk access subsystem; and receiving, by the UE, the downlink user plane media data after the encapsulation and conversion sent by the IWF through an RTP connection, where the RTP connection is an RTP connection established between the IWF and the UE by using the trunk access subsystem.

Figure 8:
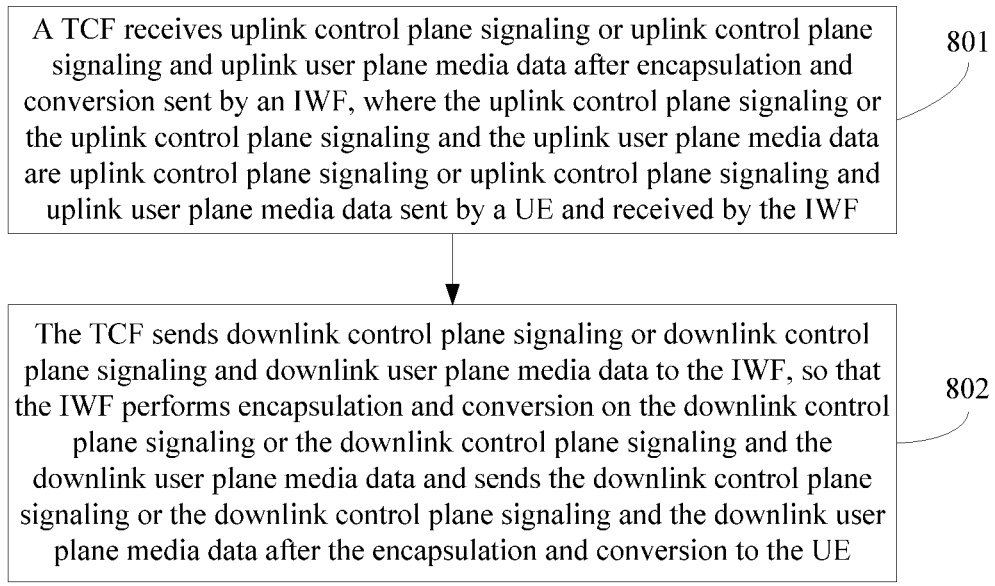
FIG. 8 is a flowchart of a method for implementing a trunk service according to another embodiment of the present invention.

In another embodiment of the present invention, a method for implementing a trunk service is provided by using implementation of a trunk service from a perspective of a trunk control function (TCF) as an example. Referring to FIG. 8, the process of the method is specifically described as follows:

801. A TCF receives uplink control plane signaling or uplink control plane signaling and uplink user plane media data after encapsulation and conversion sent by an IWF, where the uplink control plane signaling or the uplink control plane signaling and the uplink user plane media data are uplink control plane signaling or uplink control plane signaling and uplink user plane media data sent by a trunk UE and received by the IWF.

802. The TCF sends downlink control plane signaling or downlink control plane signaling and downlink user plane media data to the IWF, so that the IWF performs encapsulation and conversion on the downlink control plane signaling or the downlink control plane signaling and the downlink user plane media data and sends the downlink control plane signaling or the downlink control plane signaling and the downlink user plane media data after the encapsulation and conversion to the UE.

Further, the receiving, by a TCF, uplink control plane signaling or uplink control plane signaling and uplink user plane media data after encapsulation and conversion sent by an interworking function IWF includes: receiving, by the TCF, the uplink control plane signaling after the encapsulation and conversion sent by the IWF through an Ra interface connection, where the Ra interface connection is an Ra interface connection established between the IWF and the TCF; and receiving the uplink user plane media data after the encapsulation and conversion sent by the IWF through an Ru interface connection, where the Ru interface connection is an Ru interface connection established between the IWF and the TCF.

Further, the sending, by the TCF, downlink control plane signaling or downlink control plane signaling and downlink user plane media data to the IWF includes: sending, by the TCF, the downlink control plane signaling to the IWF through an Ra interface connection, where the Ra interface connection is an Ra interface connection established between the IWF and the TCF; and sending, by the TCF, the downlink user plane media data to the IWF through an Ru interface connection, where the Ru interface connection is an Ru interface connection established between the IWF and the TCF.

Figure 9:
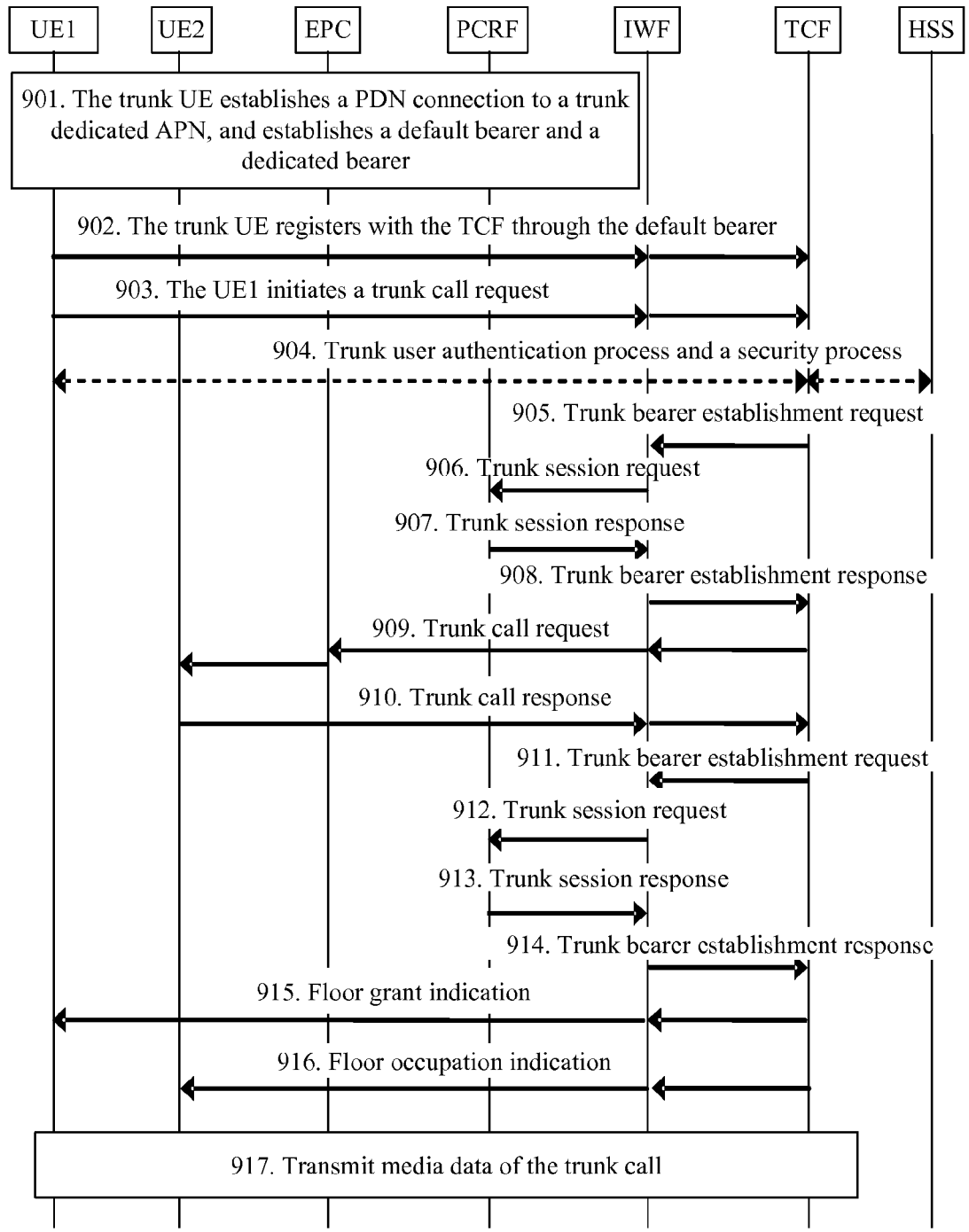
FIG. 9 is a schematic interaction diagram of a method for implementing a trunk service according to another embodiment of the present invention.

With reference to the methods provided in the foregoing embodiments, the following describes the method for implementing a trunk service in detail by using implementation of a trunk call service in a trunk service as an example. There is one calling party that initiates the trunk call service, but there may be multiple called parties, and the number of the called parties is not limited in this embodiment. Referring to FIG. 9, the process of the method provided in this embodiment is specifically as follows:

901. A trunk UE attaches to an LTE/EPS system after power-on, establishes a default bearer and a dedicated bearer, and obtains an address of an IWF in the process of establishing the bearers.

Specifically, the manner of the UE attaching to the LTE/EPS system after power-on is not limited in this embodiment, and likewise, the manner of establishing the default bearer and the dedicated bearer is not limited either. Trunk communication requires a communication establishment delay being less than 1000 ms (that is, less than 1 s), requires signaling having a high priority, and requires rapid establishment of a voice transmission channel. Therefore, this embodiment provides a technical solution for establishing a default bearer on a PDN connection of a trunk dedicated APN, so as to transmit a signaling message of the trunk communication through the default bearer, that is, transmit an IP message (that is, a Ta message) between the UE and the IWF through the default bearer. After that, signaling exchanged between the UE and the TCF is all transmitted over the default bearer.

A QoS Class Identifier (QCI) generally used by the default bearer of the LTE system is equal to 9, and a delay when QCI=9 is 300 ms, which cannot ensure that the requirement for the trunk communication call establishment delay is met. A bearer when QCI=5 (referring to Table 1 below) has the highest scheduling priority, has a delay of only 100 ms between the UE and a PGW, and has a data error rate of 10-6; this bearer is generally used for IP Multimedia Subsystem (IMS) signaling, and may also be applied to signaling for trunk communication. Therefore, the method provided in this embodiment proposes setting the QCI of the default bearer to 5, so as to meet the requirement for the trunk communication call establishment delay, and information about the QCI defined as 5 is carried in subscription data of the trunk dedicated APN of the UE.

TABLE 1

| QCI | Resource Type | Priority Level | Packet Delay | Data Error Rate | Service Instance |
|-----|---------------|----------------|--------------|-----------------|------------------|
| 5   | Non-GBR       | 1              | 100 ms       | 10-6            | IMS signaling    |

Media data of a user plane of the trunk may also be transmitted over the default bearer, but if the default bearer having the QCI=5 is used to transmit voice data, air interface resources are wasted, which not only causes low transmission efficiency, but also reduces system capacity. Therefore, in order that a delay between initiating a trunk call request in the subsequent step 903 by a UE 1 and receiving a floor grant indication message corresponding to step 915 by the UE is not greater than 1 s, and is as short as possible, the method provided in this embodiment uses a manner in which the signaling message and the voice data are transmitted respectively through different bearers. That is, a dedicated bearer is established by using a method of pre-establishing a voice transmission channel, so as to reduce the trunk call establishment delay under a premise of ensuring QoS of the voice transmission. During specific implementation, the dedicated bearer may be established when the UE establishes a PDN connection to the trunk dedicated APN, and the dedicated bearer is used to transmit the user plane media data.

For the established dedicated bearer, reference may be made to Table 2 below. Establishment of a non-GBR dedicated bearer may be initiated by a network, and a QCI in QoS of the dedicated bearer is equal to 7, where a priority level (priority Level) value of an Allocation and Retention Priority (ARP) should be higher than a priority level value of an ARP of the default bearer on the PDN connection, that is, the priority level of the ARP of the dedicated bearer is low (because a higher priority level value indicates a lower priority level). The bearer having the QCI=7 has a lower scheduling priority, has a delay of only 100 ms between the UE and the PGW, and has a data error rate of 10-3; therefore, the bearer can be used to transmit voice, video, and interactive game data, and can also be applied to transmit voice of the trunk communication. Therefore, the method provided in this embodiment proposes that the QCI of the dedicated bearer should be set to 7, so as to meet the requirement for the trunk communication call establishment delay.

TABLE 2

| QCI | Resource Type | Priority Level | Packet Delay | Data Error Rate | Service Instance |
|-----|---------------|----------------|--------------|-----------------|------------------|
| 7   | Non-GBR       | 7              | 100 ms       | 10-3            | Voice, video, game data |

In addition, for video communication, if a voice data stream and a video data stream are separated, the dedicated bearer may also be used to transmit the two media streams at the same time; if the voice data stream and the video data stream data are packed together, the dedicated bearer may be used to transmit the packed media stream at the same time. The manner of establishing the dedicated bearer is not limited in this embodiment, and a specific establishment manner may be as follows:

If a PCRF is deployed in the network, a rule for triggering the establishment of the dedicated bearer is written into the PCRF, and QCI=7 is also written into a Policy and Charging Control (PCC) rule of the PCRF, so that when the PCRF establishes an IP Connectivity Access Network (IP CAN)

session, that is, when establishing the default bearer, the PCRF triggers the PGW to establish the dedicated bearer.

If no PCRF is deployed in the network, a rule for triggering the establishment of the dedicated bearer is written into the PGW, and QCI=7 is also written into a static PCC rule of the PGW, so that the PGW initiates establishment of the dedicated bearer.

Further, according to different requirements of the trunk communication, for example, a requirement that a bearer for voice transmission and a bearer for video transmission should be separated in video communication, a third bearer or more bearers may be established according to the requirement, and the method of establishing the third bearer and subsequent bearers is the same as above, but different QoS parameters are used. However, it is required that the bearer type should be the Non-GBR type.

The PDN connection of the trunk dedicated APN may be established in many manners. For example, a default APN is configured in subscription data of the UE, and when the UE attaches to an LTE-EPS system after power-on, the UE does not provide any APN, and the network automatically selects the default APN and uses the default APN as the trunk dedicated APN, and automatically establishes a PDN connection to the trunk default APN for the UE. This manner of establishing the PDN connection of the trunk dedicated APN is very simple and effective. In addition, the PDN connection to the trunk dedicated APN may also be established in a UE Requested PDN Connectivity process initiated by the UE to the trunk dedicated APN after the UE has attached to the network. No matter in which manner is the PDN connection of the trunk dedicated APN established, all trunk UEs need to subscribe to the trunk dedicated APN, and the trunk dedicated APN is preferably defined on the default APN. Definitely, the PDN connection of the trunk dedicated APN may also be established in another manner, which is not specifically limited in this embodiment.

After the PDN connection is established, according to a 3GPP specification, a default bearer is established, and at the same time, at least one IP address is allocated to the UE. The UE may obtain an IP address of the IWF according to the allocated IP address. The IP address of the IWF may be obtained in many manners, and the manner of obtaining the address of the IWF by the UE is not limited in this embodiment. For example, an Fully Qualified Domain Name (FQDN) of the IWF is used and is configured on the UE, so that the UE may query the IP address of the IWF in a DNS manner; or in a process of establishing the PDN connection, the UE is notified of the IP address of the IWF in a Protocol Configuration Options (PCO) manner, and in this case, the UE may be notified when the UE requests the IP address of the IWF, and may also be actively notified without any request; in addition, the IP address of the IWF may also be configured manually or pre-configured in the UE.

902. The trunk UE establishes an SCTP connection or a TCP connection to the IWF through the established dedicated bearer, and sends a TCF registration message to the IWF through the SCTP connection or the TCP connection; after the IWF receives the registration message, the IWF routes the registration message to the TCF according to configured TCF address information.

Specifically, after the UE obtains the IP address of the IWF by performing the foregoing step, the SCTP connection or the TCP connection to the IP address may be initiated, and after the SCTP connection or the TCP connection is established, the UE starts to execute an original process of registering the UE with the TCF, and the IWF needs to "understand" the message for registering with the TCF. In this way, after receiving the message, the IWF initiates an Ra signaling connection to the TCF through an Ra interface, transfers the message received from the UE to the TCF, and transmits a response message from the TCF to the UE, through the established Ra interface signaling connection and the SCTP connection or the TCP connection.

In the process in which the TCF executes registration of the UE in this step, the TCF further needs to perform UE identity authentication, and may start a security process. After the identity authentication passes, and the UE has subscribed to the trunk service, the TCF sends a registration success message to the UE through the IWF.

In addition, after the UE is de-registered from the TCF, the IWF needs to delete the SCTP connection or the TCP connection between the IWF and the UE and the Ra signaling connection between the IWF and the TCF, in other words, the IWF not only simply performs encapsulation and conversion on the signaling between the UE and the TCF, but also needs to "understand" the signaling. This is because the IWF also needs to participate in processing of a TCF-RANAP protocol. In a word, for the TCF, the IWF simulates a radio access system of the TCF, but because the IWF actually does not have an LTE radio access bearer, the IWF is actually incapable of managing an LTE radio access bearer. Therefore, for a radio resource management function requested by the TCF, for example, a request for establishing, modifying, and releasing a radio channel or a request for establishing, modifying, and releasing a radio access bearer, the IWF can only respond with success correspondingly.

903. When initiating a trunk call, the trunk UE 1 sends a trunk call request message to the TCF through the default bearer and the IWF.

For this step, specific content of the trunk call request message sent by the UE 1 is not limited in this embodiment, and reference may be made to an existing trunk call process. Based on the foregoing step 901 and step 902, because the trunk UE establishes the default bearer, and establishes the SCTP connection or the TCP connection with the IWF, the trunk UE may send the trunk call request message to the IWF through the established default bearer, and the IWF forwards the trunk call request message to the TCF by using the Ra signaling established with the TCF.

904. The TCF executes UE identity authentication and a security process according to a configuration.

The executing, by the TCF, UE identity authentication and a security process according to a configuration is not limited in this embodiment, and during specific implementation, reference may be made to an existing authentication and security process.

905. The TCF sends a trunk bearer establishment request message to the IWF, and requests, by using the message, establishment of a transmission bearer of a calling party (that is, the UE 1).

Specifically, because the Ra signaling connection is established between the TCF and the IWF, the TCF sends the trunk bearer establishment request message to the IWF through the Ra signaling connection; specific content of the trunk bearer establishment request message is not limited in this embodiment, and reference may be made to an existing trunk call procedure.

906. If a PCRF is deployed in the network, the IWF sends a trunk session request message to the PCRF, and requests the PCRF to establish a transmission bearer of the EPS system.

For this step, specific content of the trunk session request message sent by the IWF is not limited in this embodiment. After receiving the trunk session request message, the PCRF may trigger the process of establishing the transmission bearer of the EPS system, and for the establishment of the transmission bearer of the EPS system, reference may be made to an existing trunk call procedure, and details are not described herein again.

907. The PCRF sends a trunk session response message to the IWF.

Specifically, because in the foregoing step 601, the trunk UE has established the corresponding default bearer and dedicated bearer, after the PCRF receives the trunk session request message sent by the IWF and establishes the transmission bearer of the EPS system accordingly, the PCRF sends the trunk session response message to the IWF. Specific content of the trunk session response message sent by the PCRF is not limited in this embodiment, and reference may be made to an existing trunk call procedure. In addition, if no PCRF is deployed in the network, or it is configured that the IWF does not need to interact with the PCRF, this step and the foregoing step 906 may be skipped, that is, after step 905 is performed, subsequent step 908 may be performed directly.

908. The IWF sends a trunk bearer establishment response message to the TCF.

For this step, specific content of the trunk bearer establishment response message is not limited in this embodiment, and reference may be made to an existing trunk call procedure. Likewise, because the Ra signaling connection is established between the IWF and the TCF, the IWF can send the trunk bearer establishment response message to the TCF through the Ra signaling connection.

909. The TCF determines a called UE according to a called party identifier, and sends a trunk call request to each UE by using an EPC.

For this step, if the called UE is in an idle state, paging needs to be further initiated on an air interface, and after the UE establishes a radio connection with the EPC in response to a paging message, the Evolved Packet Core (EPC) further transmits the buffered trunk call request message to the UE through the default bearer.

Multiple called parties may exist, and therefore, step 909 to step 914 and step 916 involved by each UE are performed in parallel.

910. The UE sends a trunk call response message to the TCF through the default bearer.

When sending the trunk call response message to the TCF through the default bearer, the UE may send the trunk call response message to the IWF through the SCTP connection or the TCP connection, and then the IWF sends the trunk call response message to the TCF through the Ra signaling connection; specific content of the trunk call response message is not limited in this embodiment, and for details, reference may be made to an existing trunk call procedure.

911-914. Establish a trunk bearer of the called party.

Specifically, step 911 to step 914 are the process of establishing the trunk bearer of the called party, and the process is similar to the process of the foregoing step 905 to step 908; for details, reference may be made to the foregoing step 905 to step 908, which are not described herein again.

It should be noted that: because step 912 and step 913 respectively correspond to step 906 and step 907, with reference to the foregoing step 906 and step 907, if no PCRF is configured in the trunk system, step 906 and step 907 may not be performed, and therefore, if no PCRF is configured in the trunk system, step 912 and step 913 may also be omitted, and after step 911 is performed, step 914 is directly performed.

915. The TCF sends a floor grant indication message to the calling UE 1, and after receiving the message, the UE 1 prompts a user that a call can be performed.

For this step, when sending the floor grant indication message to the calling UE 1, the TCF may send the floor grant indication message to the IWF through the Ra singling connection, and the IWF then forwards the floor grant indication message to the UE 1 through the SCTP connection or the TCP connection; specific content of the floor grant indication message is not limited in this embodiment, and for details, reference may be made to an existing trunk call procedure.

Likewise, a manner of prompting, by the UE 1, the user that a call can be performed is also not limited in this embodiment, and during specific implementation, the manner includes but is not limited to a manner of sound, light, vibration, or the like.

916. The TCF sends a floor occupation indication to the called UE, and after receiving the indication, the called UE selects whether to initiate preemption.

For this step, specific content of the floor occupation indication sent by the TCF is not limited in this embodiment, and for details, reference may be made to an existing trunk call procedure. The floor occupation indication sent by the TCF to the called UE may also be sent to the IWF first through the Ra signaling connection, and then be forwarded to the called UE by the IWF through the SCTP connection or the TCP connection, and after receiving the floor occupation indication, the called UE may select to perform floor occupation, and may also select not to perform floor occupation, and another trunk terminal may not respond to the preemption that may be initiated by the called UE. A specific manner of floor preemption is not limited in this embodiment.

917. Transmit media data of the trunk call.

For this step, when the media data of the trunk call is transmitted, voice media data of the calling UE 1 may be transmitted to the IWF through an RTP/UDP/IP connection and the dedicated bearer of the UE 1, and the IWF transmits the voice media data to the TCF through the Ru interface connection; the TCF transmits the received voice media data to the IWF through the Ru interface connection, and the IWF delivers the voice media data to each called UE through the RTP/UDP/IP connection and the dedicated bearer of the called UE.

After step 917, a complete trunk call establishment process is ended. In the process from the foregoing step 901 to step 917, when a dedicated bearer is pre-established and the UE initiates a trunk call, during the call establishment process, corresponding to the foregoing step 905 to step 908 and step 911 to step 914, when the TCF requests the calling party and the called part to establish transmission resources for media transmission, the IWF may rapidly respond with establishment success, thereby accelerating the call establishment process, ensuring the requirement for the call establishment delay being less than 1000 ms, and having a better call time feature, that is, having a shorter call delay. Moreover, based on the trunk system architecture and the method for implementing a trunk service provided in the foregoing embodiments, other related trunk service processes, such as call preemption, may also be implemented likewise, which are not introduced one by one in this embodiment.

Further, after the call ends, when the TCF requests the calling party and the called party to release the transmission resources for media transmission, the IWF may immediately respond with release success, but the dedicated bearer pre-established previously may not be released accordingly. The reason why the dedicated bearer pre-established previously may not be released is that when the TCF requests releasing of the resources, the IWF actually does not perform an action of releasing the resources, but just returns a response indicating that the resources are released successfully, and therefore, resources corresponding to the dedicated bearer always exist. Therefore, establishing a call subsequently may be accelerated, and there is no need to repeatedly establish a dedicated bearer repeatedly during the next call.

Figure 10:
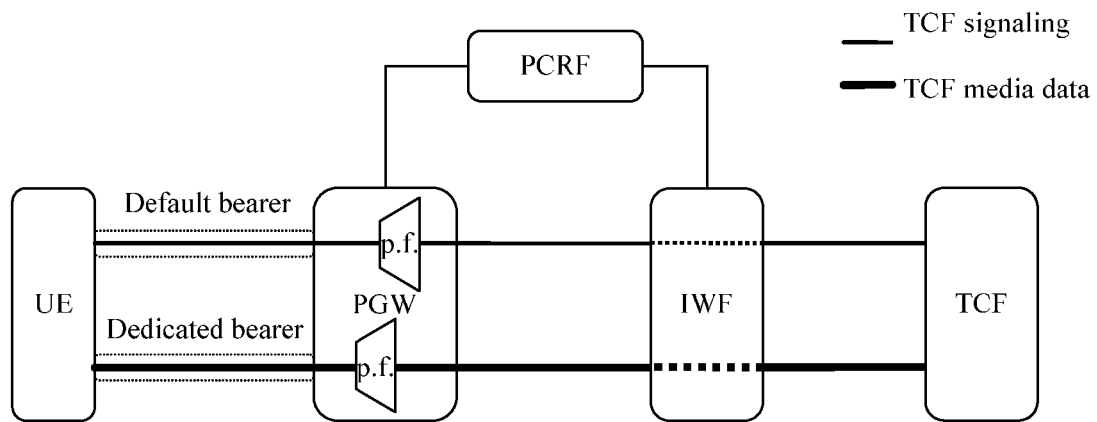
FIG. 10 is a schematic diagram of channel transmission according to another embodiment of the present invention.

In addition, the method provided in this embodiment adopts a manner of transmitting the signaling and the media data of the TCF over the Ra and Ru interfaces between the IWF and the TCF by using different planes, and therefore, after the signaling and the media data sent by the TCF reach the IWF, the IWF may transmit the messages through different transmission bearers according to the different planes. For example, as shown in FIG. 10, in a downlink direction from the TCF to the UE, the signaling of the TCF received by the IWF from the Ra interface is transmitted to the UE through the default bearer; the media data of the TCF received from the Ru interface is transmitted to the UE through the dedicated bearer. In an uplink direction from the UE to the TCF, the signaling received by the IWF from the default bearer may be transmitted to the TCF through the Ra interface; the media data received from the dedicated bearer may be transmitted to the TCF through the Ru interface. Compared with transmitting the user plane media data and the control plane signaling through the same default bearer, transmitting the user plane media data and the control plane signaling through separated bearers implements data classification and forwarding more easily.

Further, when the signaling related to the TCF is transmitted through the default bearer, and the media data related to the TCF is transmitted through the dedicated bearer, the UE and the PGW need to know mapping relationships of data streams, and accordingly, many methods may be used to implement the mapping relationships, including, but not limited to:

First implementation manner: Implement the mapping relationships by using different types of data streams with a fixed port number and/or protocol type. For example, a data stream for transmitting the TCF-related signaling is transmitted by using the SCTP or TCP, and the data stream for transmitting the media stream is transmitted by using the RTP/UDP, and if a PCRF is deployed in the trunk system, the fixed rule may be configured on the PCRF, and if no PCRF is deployed in the trunk system, the fixed rule may be configured on the PGW. In this way, when the default bearer and the dedicated bearer are established, the PGW may generate TFTs of the bearers and transfer the TFTs to the UE by using the SGW and the MME. When this method is used, it is required that the IWF should use a fixed port, and this manner is simple and effective.

Second implementation manner: Implement the mapping relationships by using the IWF with a dynamic port. That is, the IWF transmits information of the TCF signaling stream and information of the media stream (port+protocol) to the PGW by using the PCRF, and the PGW generates TFTs of the bearers, and transfers the Traffic Flow Template (TFT) to the UE by using a bearer modification method. An advantage of this manner is that the IWF is allowed to perform dynamic port allocation. Although the media data needs to be transmitted through the default bearer before the PCRF transfers the TFTs to the UE by using the bearer modification method, impact on the user is quite limited.

In addition, an important feature of a broadband trunk system is that, in addition to ensuring system performance, the broadband trunk system can further support Internet access, and support calls with UEs in a fixed network and a mobile network. Because the trunk service is identified by using a specific trunk APN in the trunk system provided in the foregoing embodiment, the trunk service can be implemented by using another APN when another service is used, for example, an Internet service. A voice service and a calls function with UEs in the fixed network and the mobile network may be implemented by using the IMS. In addition, the UE may activate a Circuit Switched Fallback (CSFB) function, and when the user intends to use a CS service, the UE implements the CS domain service by rolling back to a CS domain of 2G or 3G network by using the CSFB function. If To implement these multimedia trunk functions, it is required that the TCF should support the functions of multimedia trunk communication, and this is a function requirement of the TCF. The architecture provided in the embodiment of the present invention does not definitely decide that the TCF must have the functions of multimedia trunk communication. Moreover, the method for implementing a trunk service provided in this embodiment allows the trunk to be implemented in a public network and further implemented in a private network.

Figure 11:
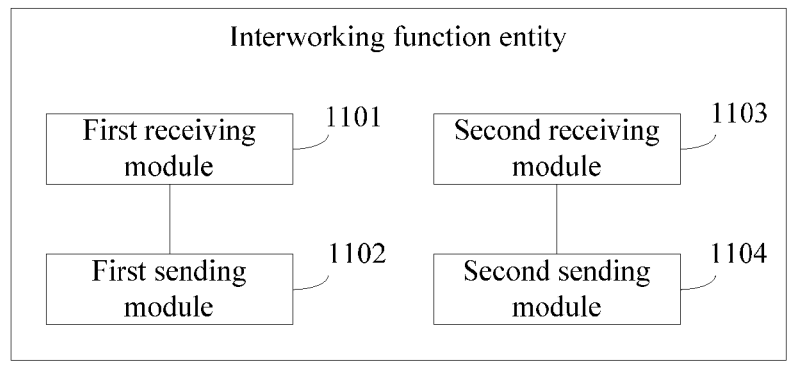
FIG. 11 is a schematic structural diagram of an interworking function according to another embodiment of the present invention.

In another embodiment of the present invention, an interworking function is provided. Referring to FIG. 11, the interworking function IWF includes: a first receiving module 1101, configured to receive uplink control plane signaling or uplink control plane signaling and uplink user plane media data sent by a trunk UE; a first sending module 1102, configured to perform encapsulation and conversion on the uplink control plane signaling or the uplink control plane signaling and the uplink user plane media data received by the first receiving module 1101, and send the uplink control plane signaling or the uplink control plane signaling and the uplink user plane media data after the encapsulation and conversion to a trunk control function (TCF); a second receiving module 1103, configured to receive downlink control plane signaling or downlink control plane signaling and downlink user plane media data sent by the TCF; and a second sending module 1104, configured to perform encapsulation and conversion on the downlink control plane signaling or the downlink control plane signaling and the downlink user plane media data received by the second receiving module 1103, and send the downlink control plane signaling or the downlink control plane signaling and the downlink user plane media data after the encapsulation and conversion to the UE.

Further, the first receiving module 1101 is specifically configured to receive, from a default bearer in a trunk access subsystem, the uplink control plane signaling or the uplink control plane signaling and the uplink user plane media data sent by the UE, where the default bearer is a default bearer on a packet data network PDN connection established by the UE to a dedicated access point name APN corresponding to a trunk.

Further, the first receiving module 1101 is specifically configured to receive, from a default bearer in a trunk access subsystem, the uplink control plane signaling sent by the UE, and receive, from a dedicated bearer, the uplink user plane media data sent by the UE, where the default bearer and the dedicated bearer are a default bearer and a dedicated bearer on a packet data network PDN connection established by the UE to a dedicated access point name APN corresponding to the trunk.

Further, the first receiving module 1101 is specifically configured to receive, through a Stream Control Transmission Protocol SCTP connection or a Transmission Control Protocol TCP connection, the uplink control plane signaling sent by the UE; and receive, through a Real-time Transport Protocol RTP connection, the uplink user plane media data sent by the UE to the TCF, where the SCTP connection or the TCP connection is an SCTP connection or a TCP connection established between the IWF and the UE by using a trunk access subsystem, and the RTP connection is an RTP connection established between the IWF and the UE by using the trunk access subsystem.

Further, the first sending module 1102 is specifically configured to perform encapsulation and conversion on the uplink control plane signaling sent by the UE to the TCF, and send the uplink control plane signaling after the encapsulation and conversion to the TCF through an Ra interface connection; perform encapsulation and conversion on the uplink user plane media data sent by the UE to the TCF, and send the uplink user plane media data after the encapsulation and conversion to the TCF through an Ru interface connection, where the Ra interface connection is an Ra interface connection established between the IWF and the TCF, and the Ru interface connection is an Ru interface connection established between the IWF and the TCF.

Further, the second receiving module 1103 is specifically configured to receive the downlink control plane signaling sent by the TCF to the UE through an Ra interface connection; and receive the downlink user plane media data sent by the TCF to the UE through an Ru interface connection, where the Ra interface connection is an Ra interface connection established between the IWF and the TCF, and the Ru interface connection is an Ru interface connection established between the IWF and the TCF.

Further, the second sending module 1104 is specifically configured to perform encapsulation and conversion on the downlink control plane signaling or the downlink control plane signaling and the downlink user plane media data, and send, through a default bearer in the trunk access subsystem, the downlink control plane signaling or the downlink control plane signaling and the downlink user plane media data after the encapsulation and conversion to the UE, where the default bearer is a default bearer on a packet data network PDN connection established by the UE to a dedicated access point name APN corresponding to the trunk.

Further, the second sending module 1104 is specifically configured to perform encapsulation and conversion on the downlink control plane signaling and the downlink user plane media data, send, through a default bearer in the trunk access subsystem, the downlink control plane signaling after the encapsulation and conversion to the UE, and send, through a dedicated bearer in the trunk access system, the downlink user plane media data after the encapsulation and conversion to the UE, where the default bearer and the dedicated bearer are a default bearer and a dedicated bearer on a packet data network PDN connection established by the UE to a dedicated access point name APN corresponding to the trunk.

Further, the second sending module 1104 is specifically configured to send the downlink control plane signaling to the UE through an SCTP connection or a TCP connection; and send the downlink user plane media data to the UE through an RTP connection, where the SCTP connection or the TCP connection is an SCTP connection or a TCP connection established between the IWF and the UE by using the trunk access subsystem, and the RTP connection is an RTP connection established between the IWF and the UE by using the trunk access subsystem.

Figure 12:
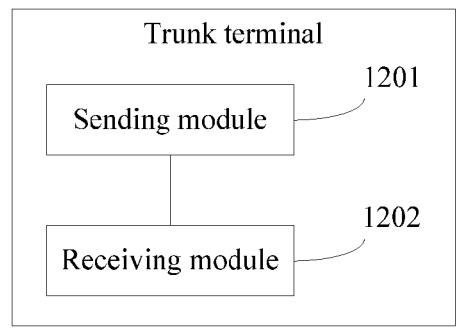
FIG. 12 is a schematic structural diagram of a trunk terminal according to another embodiment of the present invention.

In another embodiment of the present invention, a trunk terminal is provided. Referring to FIG. 12, the trunk UE includes: a sending module 1201, configured to send uplink control plane signaling or uplink control plane signaling and uplink user plane media data to an IWF, so that the IWF performs encapsulation and conversion on the uplink control plane signaling or the uplink control plane signaling and the uplink user plane media data and sends the uplink control plane signaling or the uplink control plane signaling and the uplink user plane media data after the encapsulation and conversion to a TCF, and the TCF sends downlink control plane signaling or downlink control plane signaling and downlink user plane media data to the IWF; and a receiving module 1202, configured to receive the downlink control plane signaling or the downlink control plane signaling and the downlink user plane media data after encapsulation and conversion sent by the IWF.

Further, the sending module 1201 is specifically configured to send, from a default bearer in a trunk access subsystem, the uplink control plane signaling or the uplink control plane signaling and the uplink user plane media data, where the default bearer is a default bearer on a packet data network PDN connection established by the UE to a dedicated access point name APN corresponding to a trunk.

Further, the sending module 1201 is specifically configured to send the uplink control plane signaling from a default bearer in a trunk access subsystem, and send the uplink user plane media data from a dedicated bearer, where the default bearer and the dedicated bearer are a default bearer and a dedicated bearer on a packet data network PDN connection established by the UE to a dedicated access point name APN corresponding to the trunk.

Further, the sending module 1201 is specifically configured to send, through a Stream Control Transmission Protocol SCTP connection or a Transmission Control Protocol TCP connection, the uplink control plane signaling to the IWF, and send, through a Real-time Transport Protocol RTP connection, the uplink user plane media data to the IWF, where the SCTP connection or the TCP connection is an SCTP connection or a TCP connection established between the UE and the IWF by using a trunk access subsystem, and the RTP connection is an RTP connection established between the IWF and the UE by using the trunk access subsystem.

Further, the receiving module 1202 is specifically configured to receive the downlink control plane signaling or the downlink control plane signaling and the downlink user plane media data after the encapsulation and conversion sent by the IWF through a default bearer in the trunk access subsystem, where the default bearer is a default bearer on a packet data network PDN connection established by the UE to a dedicated access point name APN corresponding to the trunk.

Further, the receiving module 1202 is specifically configured to receive the downlink control plane signaling after the encapsulation and conversion sent by the IWF through a default bearer in the trunk access subsystem, and receive the downlink user plane media data after the encapsulation and conversion sent through a dedicated bearer in the trunk access subsystem, where the default bearer and the dedicated bearer are a default bearer and a dedicated bearer on a packet data network PDN connection established by the UE to a dedicated access point name APN corresponding to the trunk.

Further, the receiving module 1202 is specifically configured to receive the downlink control plane signaling after the encapsulation and conversion sent by the IWF through an SCTP connection or a TCP connection; and receive the downlink user plane media data after the encapsulation and conversion sent by the IWF through an RTP connection, where the SCTP connection or the TCP connection is an SCTP connection or a TCP connection established between the UE and the IWF by using the trunk access subsystem, and the RTP connection is an RTP connection established between the IWF and the UE by using the trunk access subsystem.

Figure 13:
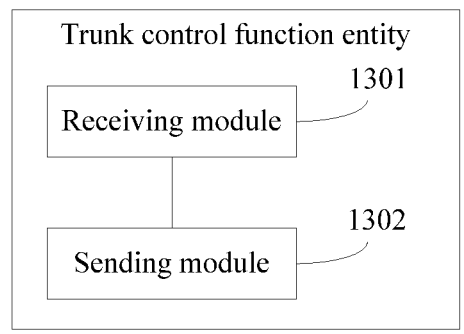
FIG. 13 is a schematic structural diagram of an trunk control function according to another embodiment of the present invention.

In another embodiment of the present invention, a trunk control function is provided. Referring to FIG. 13, the trunk control function (TCF) includes a receiving module 1301, configured to receive uplink control plane signaling or uplink control plane signaling and uplink user plane media data after encapsulation and conversion sent by an IWF, where the uplink control plane signaling or the uplink control plane signaling and the uplink user plane media data are uplink control plane signaling or uplink control plane signaling and uplink user plane media data sent by a trunk UE and received by the IWF; and a sending module 1302, configured to send downlink control plane signaling or downlink control plane signaling and downlink user plane media data to the IWF, so that the IWF performs encapsulation and conversion on the downlink control plane signaling or the downlink control plane signaling and the downlink user plane media data and sends the downlink control plane signaling or the downlink control plane signaling and the downlink user plane media data after the encapsulation and conversion to the UE.

Further, the receiving module 1301 is specifically configured to receive the uplink control plane signaling after the encapsulation and conversion sent by the IWF through an Ra interface connection; and receive the uplink user plane media data after the encapsulation and conversion sent by the IWF through an Ru interface connection, where the Ra interface connection is an Ra interface connection established between the IWF and the TCF, and the Ru interface connection is an Ru interface connection established between the IWF and the TCF.

Further, the sending module 1302 is specifically configured to send the downlink control plane signaling to the IWF through an Ra interface connection; and send the downlink user plane media data to the IWF through an Ru interface connection, where the Ra interface connection is an Ra interface connection established between the IWF and the TCF, and the Ru interface connection is an Ru interface connection established between the IWF and the TCF.

Figure 14:
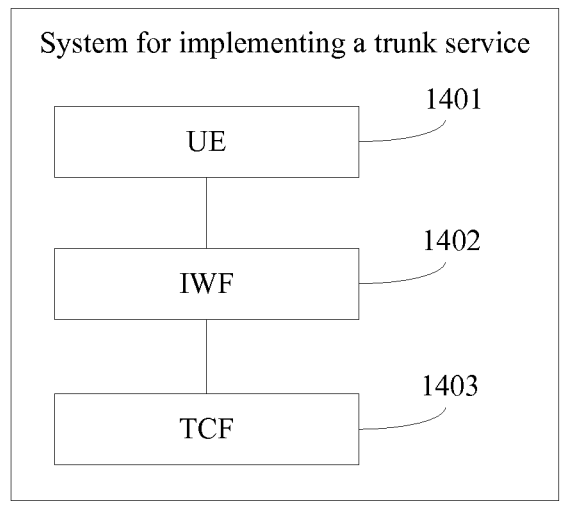
FIG. 14 is a schematic structural diagram of a system for implementing a trunk service according to another embodiment of the present invention.

In another embodiment of the present invention, a system for implementing a trunk service is provided. Referring to FIG. 14, the system includes: a UE 1401, an IWF 1402, and a TCF 1403.

The UE 1401 may be the trunk terminal provided in the foregoing embodiments, the IWF 1402 may be the interworking function provided in the foregoing embodiments, and the TCF 1403 may be the trunk control function provided in the foregoing embodiments. For details, reference may be made to the foregoing embodiments, which are not described herein again.

In the method for implementing a trunk service, the interworking function, the trunk terminal, the trunk control function entity, and the system for implementing a trunk service provided in the foregoing embodiments, by using an IWF configured to perform encapsulation and conversion on control plane signaling and user plane media data between a UE and a TCF, a trunk system is introduced to a new radio access system LTE/EPS, which can not only expand functions of the trunk system, but also greatly increase a speed of a trunk product entering a market, ensure functions of the trunk system, and lower a development cost of the trunk product in the new radio access technology. In the new radio access system, not only higher radio spectral efficiency can be provided, but also more trunk users can be provided. In addition, it is proposed that a bearer feature of the LTE/EPS system should be fully utilized, so that trunk call time may be reduced greatly, thereby implementing a better paging feature.

It should be noted that, when the trunk service is implemented by the interworking function, the trunk terminal, and the trunk control function provided in the foregoing embodiments, only the foregoing division of functional modules is used as an example. In an actual application, the foregoing functions may be allocated to different modules for implementation as required, that is, internal structures of the interworking function, the trunk terminal, and the trunk control function are divided into different functional modules to implement all or a part of functions described in the foregoing. In addition, the interworking function, the trunk terminal, and the trunk control function provided in the foregoing embodiments have the same concept as the method embodiments for implementing a trunk service; for the specific implementation processes thereof, reference may be made to the method embodiments, which are not described herein again.

A person of ordinary skill in the art may understand that all or a part of the steps of the embodiments may be implemented by hardware or a program instructing relevant hardware. The program may be stored in a computer readable storage medium. The storage medium may include: a read-only memory, a magnetic disk, or an optical disc.

The foregoing descriptions are only exemplary embodiments of the present invention, and are not intended to limit the present invention. Any modification, equivalent replacement, and improvement made within the spirit and principle of the present invention should all fall within the protection scope of the present invention.

What is claimed is:

1. A method for implementing a trunk service, wherein the method comprises:

receiving, by an interworking function (IWF) entity, uplink signaling comprising at least uplink control plane signaling and uplink user plane media data sent by a trunk user equipment (UE);

performing, by the IWF entity, encapsulation and conversion on the uplink signaling by encapsulating and converting the uplink control plane signaling using a first transmission protocol and further by encapsulating and converting the uplink user plane media data using a second transmission protocol different from the first transmission protocol, the performing encapsulation and conversion on the uplink signaling generating encapsulated and converted uplink signaling comprising encapsulated and converted uplink control plane signaling and further comprising encapsulated and converted uplink user plane media data;

sending the encapsulated and converted uplink signaling to a trunk control function (TCF) entity;

receiving, by the IWF entity, downlink signaling comprising at least downlink control plane signaling sent by the TCF entity;

performing, by the IWF entity, encapsulation and conversion on the downlink signaling to obtain encapsulated and converted downlink signaling; and sending the encapsulated and converted downlink signaling to the UE.

2. The method according to claim 1, wherein receiving the uplink signaling sent by the trunk UE comprises:

receiving, from a default bearer in a trunk access subsystem, the uplink signaling sent by the UE, wherein the default bearer is on a packet data network (PDN) connection established by the UE to a dedicated access point name (APN) corresponding to a trunk.

3. The method according to claim 1, wherein receiving the uplink signaling sent by the trunk UE comprises:

receiving, from a default bearer in a trunk access subsystem, the uplink control plane signaling sent by the trunk UE; and receiving, through a dedicated bearer in the trunk access subsystem, the uplink user plane media data sent by the trunk UE, wherein the default bearer and the dedicated bearer are bearers on a packet data network PDN connection established by the UE to a dedicated access point name (APN) corresponding to a trunk.

4. The method according to claim 1, wherein receiving the uplink signaling sent by the trunk UE comprises:
  receiving, through a Stream Control Transmission Protocol (SCTP) connection or a Transmission Control Protocol (TCP) connection, the uplink control plane signaling sent by the UE, wherein the SCTP connection or the TCP connection is an SCTP connection or a TCP connection established between the IWF entity and the UE using a trunk access subsystem; and
  receiving, through a Real-time Transport Protocol (RTP) connection, the uplink user plane media data sent by the UE to the TCF entity, wherein the RTP connection is an RTP connection established between the IWF entity and the UE using the trunk access subsystem.

5. The method according to claim 1,
  wherein sending the encapsulated and converted uplink signaling comprises:
  sending the encapsulated and converted uplink control plane signaling to the TCF entity through an Ra interface connection, wherein the Ra interface connection is established between the IWF entity and the TCF entity; and
  sending the encapsulated and converted uplink user plane media data to the TCF entity through an Ru interface connection, wherein the Ru interface connection established between the IWF entity and the TCF entity.

6. The method according to claim 1, wherein the downlink signaling further comprises downlink user plane media data, and wherein receiving the downlink signaling sent by the TCF entity comprises:
  receiving the downlink control plane signaling through an Ra interface connection, wherein the Ra interface connection is established between the IWF entity and the TCF entity; and
  receiving, by the IWF entity, the downlink user plane media data sent by the TCF entity to the UE through an Ru interface connection, wherein the Ru interface connection is established between the IWF entity and the TCF entity.

7. A method for implementing a trunk service, the method comprising:
  sending, by a trunk user equipment (UE), uplink signaling that includes at least uplink control plane signaling and uplink user plane media data to an interworking function (IWF) entity to prompt the IWF entity to perform encapsulation and conversion on the uplink signaling by encapsulating and converting the uplink control plane signaling using a first transmission protocol and further by encapsulating and converting the uplink user plane media data using a second transmission protocol different from the first transmission protocol, and to further prompt the IWF entity to send the resulting encapsulated and converted uplink signaling to a trunk control function (TCF) entity; and
  receiving, by the trunk UE, encapsulated and converted downlink signaling sent by the IWF entity, wherein the encapsulated and converted downlink signaling was obtained by the IWF entity through encapsulating and converting downlink signaling communicated from the TCF entity to the IWF entity, and wherein the downlink signaling includes at least downlink control plane signaling.

8. The method according to claim 7, wherein sending the uplink signaling to the IWF entity comprises:
  sending, by the trunk UE from a default bearer in a trunk access subsystem, the uplink signaling to the IWF, wherein the default bearer is on a packet data network PDN connection established by the trunk UE to a dedicated access point name (APN) corresponding to a trunk.

9. The method according to claim 7, wherein sending the uplink signaling to the IWF entity comprises:
  sending, by the trunk UE, the uplink control plane signaling from a default bearer in a trunk access subsystem; and
  sending, by the trunk UE, the uplink user plane media data from a dedicated bearer in the trunk access subsystem, wherein the default bearer and the dedicated bearer are bearers on a packet data network (PDN) connection established by the trunk UE to a dedicated APN corresponding to a trunk.

10. A method for implementing a trunk service, wherein the method comprises:
  receiving, by a trunk control function (TCF) entity, encapsulated and converted uplink signaling from an interworking function (IWF) entity, the encapsulated and converted uplink signaling being formed at the IWF entity by encapsulating and converting uplink signaling communicated from a trunk UE to the IWF entity, wherein the uplink signaling includes at least uplink control plane signaling and uplink user plane media data, and wherein the encapsulated and converted uplink signaling includes encapsulated and converted uplink control plane signaling encapsulated and converted using a first transmission protocol and encapsulated and converted uplink user plane media data encapsulated and converted using a second transmission protocol different from the first transmission protocol; and
  sending, by the TCF entity, downlink signaling that includes at least downlink control plane signaling to the IWF entity to prompt the IWF entity both to perform encapsulation and conversion on the downlink control plane signaling and to send the resulting encapsulated and converted downlink control plane signaling to the trunk UE.

11. The method according to claim 10, wherein receiving the encapsulated and converted uplink signaling sent by the IWF entity comprises:
  receiving, by the TCF entity, the encapsulated and converted uplink control plane signaling through an Ra interface connection, wherein the Ra interface connection is established between the IWF entity and the TCF entity; and
  receiving the encapsulated and converted uplink user plane media data through an Ru interface connection, wherein the Ru interface connection is established between the IWF entity and the TCF entity.

12. The method according to claim 10, wherein the downlink signaling further comprises downlink user plane media data, and wherein sending the downlink signaling to the IWF entity comprises:
  sending, by the TCF entity, the downlink control plane signaling to the IWF entity through an Ra interface connection, wherein the Ra interface connection is established between the IWF entity and the TCF entity; and
  sending, by the TCF entity, the downlink user plane media data to the IWF entity through an Ru interface connection, wherein the Ru interface connection is established between the IWF entity and the TCF entity.

13. An interworking function (IWF) entity, comprising:
a receiver, configured to receive uplink signaling that includes at least uplink control plane signaling and uplink user plane media data sent by a trunk user equipment (UE); and
a transmitter, configured to perform encapsulation and conversion on the uplink signaling by encapsulating and converting the uplink control plane signaling using a first transmission protocol and further by encapsulating and converting the uplink user plane media data using a second transmission protocol different from the first transmission protocol, to obtain encapsulated and converted uplink signaling including encapsulated and converted uplink control plane signaling and further comprising encapsulated and converted uplink user plane media data, and to send the encapsulated and converted uplink signaling to a trunk control function (TCF) entity,
wherein the receiver is further configured to receive downlink signaling that includes at least downlink control plane signaling sent by the TCF entity, and
wherein the transmitter is further configured to perform encapsulation and conversion on the downlink signaling to obtain encapsulated and converted downlink signaling, and to send the encapsulated and converted downlink signaling to the trunk UE.

14. The interworking function entity according to claim 13, wherein the receiver is further configured to receive, from a default bearer in a trunk access subsystem, the uplink signaling sent by the trunk UE, and wherein the default bearer is on a packet data network (PDN) connection established by the trunk UE to a dedicated access point name (APN) corresponding to a trunk.

15. The interworking function entity according to claim 13, wherein the receiver is further configured to receive, from a default bearer in a trunk access subsystem, the uplink control plane signaling sent by the UE, and to receive, from a dedicated bearer, the uplink user plane media data sent by the UE, wherein the default bearer and the dedicated bearer are bearers on a PDN connection established by the UE to a dedicated APN corresponding to a trunk.

16. The interworking function entity according to claim 13, wherein the receiver is further configured to receive, through a Stream Control Transmission Protocol (SCTP) connection or a Transmission Control Protocol (TCP) connection, the uplink control plane signaling sent by the trunk UE, and to receive, through a Real-time Transport Protocol (RTP) connection, the uplink user plane media data sent by the trunk UE to the TCF entity, wherein the SCTP connection or the TCP connection is a connection established between the IWF entity and the trunk UE by using a trunk access subsystem, and wherein the RTP connection is established between the IWF entity and the trunk UE by using the trunk access subsystem.

17. The interworking function entity according to claim 13 wherein the transmitter is configured to send the encapsulated and converted uplink signaling to the TCF entity by sending the encapsulated and converted uplink control plane to the TCF entity through an Ra interface connection, and by sending the encapsulated and converted uplink user plane media data to the TCF entity through an Ru interface connection, wherein the Ra interface connection is established between the IWF entity and the TCF entity, and wherein the Ru interface connection is established between the IWF entity and the TCF entity.

18. The interworking function entity according to claim 13, wherein the downlink signaling further comprises downlink user plane media data, and wherein the receiver is further configured to receive the downlink control plane signaling sent by the TCF entity to the UE through an Ra interface connection, and to receive the downlink user plane media data sent by the TCF entity to the UE through an Ru interface connection, wherein the Ra interface connection is established between the IWF entity and the TCF entity, and wherein the Ru interface connection is established between the IWF entity and the TCF entity.

19. A trunk terminal, comprising:
a transmitter, configured to send uplink signaling including at least uplink control plane signaling and uplink user plane media data to an interworking function (IWF) entity to prompt the IWF entity both to perform encapsulation and conversion on the uplink signaling by encapsulating and converting the uplink control plane signaling using a first transmission protocol and further by encapsulating and converting the uplink user plane media data using a second transmission protocol different from the first transmission protocol, and to further prompt the IWF entity to send the resulting encapsulated and converted uplink signaling to a trunk control function (TCF) entity; and
a receiver, configured to receive encapsulated and converted downlink signaling sent by the IWF entity, wherein the encapsulated and converted downlink signaling was obtained by the IWF entity through encapsulating and converting downlink signaling communicated from the TCF entity to the IWF entity, and wherein the downlink signaling includes at least downlink control plane signaling.

20. The trunk terminal according to claim 19, wherein the transmitter is configured to send the uplink signaling to the IWF entity by sending, from a default bearer in a trunk access subsystem, the uplink signaling to the IWF entity, wherein the default bearer is on a packet data network (PDN) connection established by the trunk terminal to a dedicated access point name (APN) corresponding to a trunk.

21. The trunk terminal according to claim 19, wherein the transmitter is configured to send the uplink signaling to the IWF entity by sending the uplink control plane signaling from a default bearer in a trunk access subsystem, and by sending the uplink user plane media data from a dedicated bearer, wherein the default bearer and the dedicated bearer are bearers on a packet data network (PDN) connection established by the trunk terminal to a dedicated access point name (APN) corresponding to a trunk.

22. A trunk control function (TCF) entity, comprising:
a receiver, configured to receive encapsulated and converted uplink signaling sent by an interworking function (IWF) entity, wherein the encapsulated and converted uplink signaling was formed at the IWF entity by encapsulating and converting uplink signaling communicated from a trunk user equipment (UE) to the IWF entity, wherein the uplink signaling includes at least uplink control plane signaling and uplink user plane media data, and wherein the encapsulated and converted uplink signaling includes encapsulated and converted uplink control plane signaling encapsulated and converted using a first transmission protocol and encapsulated and converted uplink user plane media data encapsulated and converted using a second transmission protocol different from the first transmission protocol; and
a transmitter, configured to send downlink signaling that includes at least downlink control plane signaling to the IWF to prompt the IWF entity both to perform encapsulation and conversion on the downlink signaling and to send the resulting encapsulated and converted downlink signaling to the UE.

* * * * *